US011983747B2

(12) United States Patent
Ravindran et al.

(10) Patent No.: US 11,983,747 B2
(45) Date of Patent: May 14, 2024

(54) USING MACHINE LEARNING TO IDENTIFY HIDDEN SOFTWARE ISSUES

(71) Applicant: Intuit Inc., Mountain View, CA (US)

(72) Inventors: Akshay Ravindran, Mountain View, CA (US); Avinash Thekkumpat, Mountain View, CA (US); Raja Sabra, San Jose, CA (US); Shylaja R. Deshpande, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/194,580

(22) Filed: Mar. 31, 2023

(65) Prior Publication Data
US 2023/0385884 A1 Nov. 30, 2023

Related U.S. Application Data

(63) Continuation of application No. 17/827,512, filed on May 27, 2022, now Pat. No. 11,645,683.

(51) Int. Cl.
G06Q 30/0282 (2023.01)
G06F 40/295 (2020.01)
G06F 40/30 (2020.01)
G06N 3/044 (2023.01)
G06N 3/045 (2023.01)
(Continued)

(52) U.S. Cl.
CPC ....... G06Q 30/0282 (2013.01); G06F 40/295 (2020.01); G06N 7/01 (2023.01); G06F 40/30 (2020.01); G06N 3/044 (2023.01); G06N 3/045 (2023.01); G06N 3/08 (2013.01); G06N 20/00 (2019.01); G06N 20/10 (2019.01)

(58) Field of Classification Search
CPC ... G06Q 30/0282; G06F 40/295; G06F 40/30; G06N 7/01; G06N 20/00; G06N 20/10; G06N 3/044; G06N 3/045; G06N 3/08
See application file for complete search history.

(56) References Cited

U.S. PATENT DOCUMENTS

2018/0260860 A1* 9/2018 Devanathan .......... G06F 16/353
2020/0279075 A1* 9/2020 Avedissian ............. G06N 20/00
2022/0245354 A1* 8/2022 Mackay .................. G10L 25/57

OTHER PUBLICATIONS

Hemalatha et al., (NPL- "Sentiment Analysis of Yelp Reviews by Machine Learning" -Published 2019 -pp. 700-704 (Year: 2019).*

(Continued)

Primary Examiner — Quoc A Tran
(74) Attorney, Agent, or Firm — Lathrop GPM LLP

(57) ABSTRACT

A method including preprocessing natural language text by cleaning and vectorizing the natural language text. A first machine learning model (MLM) extracts negative reviews. A first input to the first MLM is the natural language text and a first output of the first MLM is first probabilities that the negative reviews have negative sentiments. The method also includes categorizing the negative reviews by executing a second MLM. A second input to the second MLM is the negative reviews. A second output of the second MLM is second probabilities that the negative reviews are assigned to categories. The method also includes identifying, using a name recognition controller and based on categorizing, a name of a software application in the negative reviews and sorting the negative reviews into a subset of negative reviews relating to the name. The software application is adjusted based on the subset of negative reviews.

20 Claims, 13 Drawing Sheets

(51) Int. Cl.
 *G06N 3/08* (2023.01)
 *G06N 7/01* (2023.01)
 *G06N 20/00* (2019.01)
 *G06N 20/10* (2019.01)

(56) References Cited

OTHER PUBLICATIONS

C. Anderson et al., "Automatic Extraction of Medication Names in Tweets as Named Entity Recognition", Nov. 30, 2021, https://arxiv.org/pdf/2111.15641.pdf (4 pages).

* cited by examiner

USING MACHINE LEARNING TO IDENTIFY HIDDEN SOFTWARE ISSUES

RELATED APPLICATIONS

This application is a continuation application of U.S. patent application Ser. No. 17/827,512, filed May 27, 2022, the entirety of which is hereby incorporated by reference.

BACKGROUND

Software can have hidden technical problems or issues. In other words, software can have problems that are not immediately apparent to one or more technicians or automated programs assigned to monitoring the operation of the software.

For example, the software may execute entirely as desired by the software's programmers. However, users may have difficulty interacting with the graphical user interface (GUI) of the software, become frustrated, and become disinclined to use the software. Such negative user experiences may be considered a technical problem or issue with the software GUI but may escape the notice of automated software health tracking systems or monitors.

In another example, communication software appears to be functioning normally while communicating with most recipients, but may have rare, intermittent difficulty connecting to a particular internet address, web portal, or application programming interface (API). The rare failure may escape notice of automated software health tracking systems or technical monitors but may be noticed by a user who interacts frequently with the particular internet address, web portal, or API. As a result, the user may experience frustration and may be disinclined to use the software.

SUMMARY

The one or more embodiments provide for a method of troubleshooting a software application. The method includes receiving natural language text generated by different sources of information. The method also includes pre-processing the natural language text by cleaning and vectorizing the natural language text. The method also includes extracting negative reviews from the natural language text by executing a first machine learning model (MLM). A first input to the first MLM is the natural language text and a first output of the first MLM is first probabilities that the negative reviews have negative sentiments. The negative reviews include instances of the natural language text having corresponding negative sentiment probabilities above a threshold value. The method also includes categorizing the negative reviews by executing a second MLM. A second input to the second MLM is the negative reviews. A second output of the second MLM is second probabilities that the negative reviews are assigned to categories. The method also includes identifying, using a name recognition controller and based on categorizing, a name of a software application in the negative reviews and sorting the negative reviews into a subset of negative reviews relating to the name. The method also includes adjusting the software application, named by the name recognition controller, based on the subset of negative reviews.

The one or more embodiments provide for another method of troubleshooting a software application. The method includes receiving natural language text generated by different sources of information. The method also includes pre-processing the natural language text by cleaning and vectorizing the natural language text to form cleaned data. The method also includes vectorizing the cleaned data to generate a first input. Vectorizing includes inputting the natural language text to a third MLM including a bi-directional long short term memory neural network, and receiving, as output from the third MLM, the first input including a matrix of numbers representing both the natural language text and contexts of sentences in the natural language text. The method also includes extracting, after pre-processing, negative reviews from the natural language text by executing a first machine learning model (MLM). The first MLM receives the first input, and, when executed, generates a first output including first probabilities that the negative reviews have negative sentiments. The negative reviews include instances of the natural language text having corresponding negative sentiment probabilities above a threshold value. The method also includes categorizing the negative reviews by executing a second MLM. A second input to the second MLM is the negative reviews. A second output of the second MLM is second probabilities that the negative reviews are assigned to categories. The method also includes identifying, using a name recognition controller and based on categorizing, a name of the software application in the negative reviews and sorting the negative reviews into a subset of negative reviews relating to the name. The method also includes performing a word cloud analysis on the subset of negative reviews. The method also includes identifying an issue with the software application based on a subset of common words from the word cloud analysis. The method also includes adjusting the software application based on the subset of common words.

The one or more embodiments provide for another. The method includes receiving natural language text. The method also includes pre-processing the natural language text by cleaning the natural language text to form cleaned data. The method also includes vectorizing the cleaned data to generate a first input. Vectorizing includes inputting the natural language text to a third MLM including a bi-directional long short term memory neural network, and receiving, as output from the third MLM, the first input including a matrix of numbers representing both the natural language text and contexts of sentences in the natural language text. The method also includes extracting, after pre-processing, a negative review from the natural language text by executing a first machine learning model (MLM). The first MLM receives the first input and, when executed, generates a first output including a first probability that the negative review has a negative sentiment. The negative review includes an instance of the natural language text having a corresponding 4 negative sentiment probability above a threshold value. The method also includes categorizing the negative review by executing a second MLM. A second input to the second MLM is the negative review. A second output of the second MLM is a second probability that the negative review is assigned to at least one category. The method also includes identifying, using a name recognition controller and from the negative review, a name of a target of the negative review. The method also includes providing the name of the target and the at least one category.

Other aspects of the one or more embodiments will be apparent from the following description and the appended claims.

DETAILED DESCRIPTION

Figure 1A:
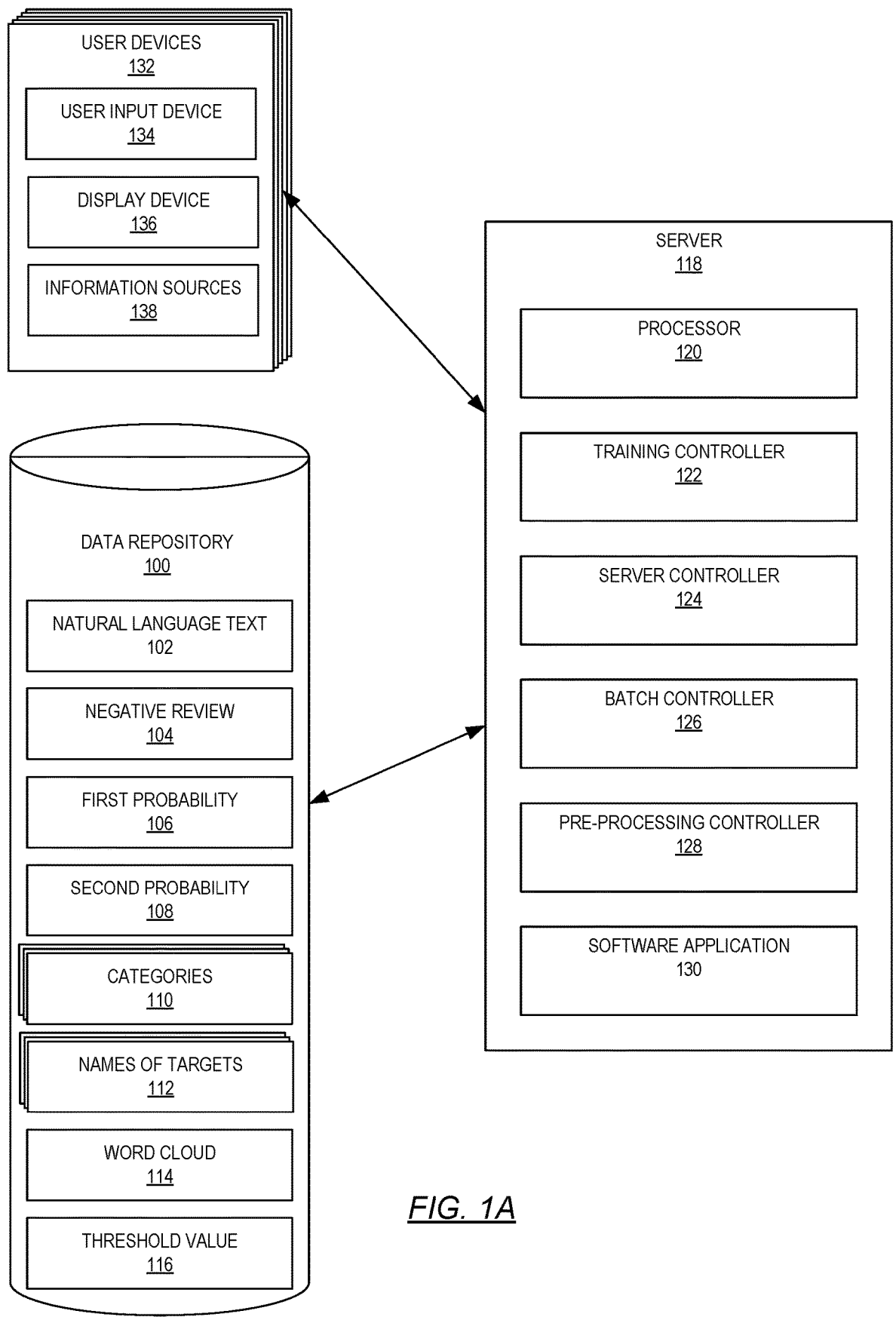
FIG. 1A, FIG. 1B, FIG. 1C, and FIG. 1D show aspect of a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

In general, the one or more embodiments related to the detection of hidden software issues. As used herein, a "hidden software issue" is an aspect of the technical operation or use of software, or communication between software programs, where the aspect is one of: 1) intermittent, 2) difficult or impracticable to observe by a software provider, or 3) not detected by an automated software health monitoring system. The hidden software issue may also be referred to as a latent issue.

An "aspect" is some definable characteristic or operation of software. Examples of "aspects" include, but are not limited to, a graphical user interface (GUI), communication protocol, application programming interface (API), software functionality (e.g., automatically recording banking transactions in a desired manner), latency (i.e., the time required to perform a function or communication), and the like.

A hidden software issue may negatively impact a user's experience of the software. Thus, the term "hidden" is as-perceived by the software provider or software monitor, as opposed to as-perceived by an end user of the software. The term "negatively impact" means that the aspect of the software is deemed undesirable by the user and may prompt the user to stop using the software, reduce use of the software, or complain to others about the software. The potential for hidden software issues is a technical problem which, because the issue is hidden, is difficult to detect and resolve.

The one or more embodiments solve the above-identified technical problem by analyzing, using machine learning, user reviews and other natural language inputs from one or more different, distinct sources of information. An ensemble of machine learning algorithms identifies negative reviews present in the distinct sources of information, and then identifies the names of targets (e.g., software names, software provider names, aspects of software, etc.). An aspect of software is a specific function of the software or a some or all of a GUI of the software.) The identity of the names of the targets are then provided to a computer programmer and/or to an automated health monitoring system, which in turn may take action to address the hidden software issues.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) also stores natural language text (102). The natural language text (102) is alphanumeric text, stored in digital form, but readable by a user when presented on a display. As explained further below, the natural language text (102) may have been retrieved or received from one or more different information sources (138). The natural language text (102) may relate to user experiences with the software application (130) described further below. In an embodiment, the natural language text (102) has been pre-processed and is ready for analysis. However, natural language text (102) that has yet to be pre-processed (i.e., the natural language text as it exists in the original information sources (138), described below) may be referred-to as raw natural language text.

The natural language text (102) may be characterized as being composed of one or more instances of natural language text (102). An instance of natural language text is one or more strings of alphanumeric text contained within the overall corpus of the natural language text (102). In other words, an instance of natural language text is a subset of the natural language text (102). As explained in more detail below, some instances of the natural language text (102) may be characterized as being negative reviews, such as the negative review (104).

A negative review (104) is a statement by a user, in natural language text, regarding a target, where the statement indicates a negative sentiment. A target is defined below with respect to the names of targets (112). However, briefly, a target is a category of interest such as, for example, the software application (130) described below. A review has a "negative sentiment" when a machine learning model (e.g., the second machine learning model (100B) in FIG. 1B), using natural language analysis, outputs a probability above a first threshold value that the statement would be deemed a negative sentiment by a user. In some cases, a user may also subjectively perceive the statement as indicating a negative sentiment.

The data repository (100) also stores a first probability (106), among possibly multiple first probabilities. The term "first," with respect to the first probability (106), is an identifying term to identify that the first probability (106) is generated by a first machine learning model, such as the first machine learning model (100B) in FIG. 1B. The first probability (106) is the output of a machine learning model trained to evaluate whether the natural language text (102) has a negative sentiment. Thus, the first probability (106) may also be referred-to as a negative sentiment probability. Where multiple negative reviews are evaluated, there may be a number of corresponding negative sentiment probabilities, one for each negative review.

The data repository (100) also stores a second probability (108). The term "second," with respect to the second probability (108), is an identifying term to identify that the second probability (108) is generated by a second machine learning model, such as the second machine learning model (120B) in FIG. 1B. The second probability (108) is the output of a machine learning model trained to evaluate a probability that the negative review (104) is classified in one of multiple possible pre-determined categories (i.e., the categories (110)).

The categories (110), in turn, are ontological groupings of negative reviews, such as the negative review (104). The ontological groupings are of interest to the programmer or automated software health system. Examples of the ontological groupings may be names of software programs, names of software providers, identifiers of individual features within software programs, categories of technical difficulties (e.g., communication faults, latency, incorrect classification of financial transactions by a financial management software application, and the like), as well as many other possible ontological groupings.

The data repository (100) also stores names of targets (112). A target is a provider, software application, or an operational aspect of a software application that is of interest to a programmer or health monitoring system responsible for identifying hidden issues in software. Multiple targets may be tracked. Examples of targets include software applications, providers, communication protocols for the software applications, one or more specific programmed functions or sub-functions of the software applications, APIs, GUIs, and the like. The names of targets (112) provide the identity of the targets. Thus, the names of targets (112) may take the form of natural language text but may also take the form of computer-readable identifiers (particularly when for use by automated software health tracking systems).

The data repository (100) also may store a word cloud (114). The word cloud (114) is a collage of natural language text taken from a corpus (e.g., a set of the natural language text (102) or a negative review (104)) arranged such that words that appear with the greatest frequency within the corpus have a greatest font size within the collage. The words may be oriented in multiple different orientation within the word cloud (114). An example of the word cloud (114) is shown in FIG. 4F.

The data repository (100) also stores one or more threshold values, such as threshold value (116). The threshold value (116) is a number that serves as a benchmark or condition when compared to some other number. For example, with respect to determining whether the natural language text (102) is a negative review (104), the threshold value (116) may be a pre-determined number. When the first probability (106) satisfies the threshold value (116), then the natural language text (102) is classified as the negative review (104). Satisfaction of the threshold occurs under pre-determined conditions, such as equaling or exceeding the threshold value (116), exceeding the threshold value (116), being less than the threshold value (116), etc. depending on how the threshold is defined (e.g., as a maximum or minimum value).

The system shown in FIG. 1 may include other components. For example, the system shown in FIG. 1 may include a server (118). The server (118) is one or more computers, possibly communicating in a distributed computing environment. Thus, the server (118) includes one or more processors, such as processor (120). The processor (120) is hardware or a virtual machine programmed to execute one or more controllers and/or software applications. The processor (120) may be, for example, the computer processor(s) (502) of FIG. 5A.

The server (118) also includes a training controller (122). The training controller (122) is one or more applications or application specific hardware programmed to train one or more of the machine learning models described herein. The training controller (122) is described in more detail with respect to FIG. 1D.

The server (118) also includes a server controller (124). The server controller (124) is one or more applications or application specific hardware programmed to control operation of the machine learning models described herein. The server controller (124) is described in more detail with respect to FIG. 1B and FIG. 1C.

The server (118) also includes a batch controller (126). The batch controller (126) is one or more applications or application specific hardware programmed to retrieve or receive natural language text, possibly from a variety of distinct sources of information. Examples of the batch controller (126) include a screen scraping application, a text bot, a database controller, and the like.

The server (118) also includes a pre-processing controller (128). The pre-processing controller (128) is one or more applications or application specific hardware programmed to process the raw natural language data retrieved or received by the batch controller (126). The output of the pre-processing controller (128) is the natural language text (102). The pre-processing controller (128) may be programmed to remove certain types of text, add metadata (e.g., timestamps, identifiers that indicate the source of information, etc.), change the file type of the raw natural language data, and the like.

The pre-processing controller (128) also may be programmed with other functions. For example, the pre-processing controller (128) may also be programmed to vectorize the natural language text (102). Vectorization is a process by which data is transformed into a vector suitable for use as input to a machine learning model. A vector is a data structure. An example of a vector is a one dimensional array of numbers in which each entry in the array is a number that reflects a value for a feature. A feature is some datum relating to the raw data before pre-processing. For example, a vector may take the form of a series of "0"s and "1" s, in which a "0" indicates the presence of a particular word and a "1" indicates the absence of a particular word, where the word are features. However, the vector may have many different forms and may have different values, depending on the specific application and the specific machine learning model to be used.

Different vectorization techniques may be used. For example, Word2Vec, Doc2Vec, and ELMO vectorization may be used. The effectiveness of Word2Vec comes from grouping together vectors of similar words. For example, "King" and "Queen" would be very similar to each other in the vector space, which helps the model to make decisions based on similarity. With respect to the one or more embodiments, similar terms could be "login" and "security," or "duplicate" and "missing". Still, the Word2Vec procedure gives higher weight to the words, rather than to the context of how the words are used.

In order to address the context of words, it is possible to use ELMO vectorization for converting a sentence to vectors. ELMO is a contextualized deep embedding model, which is dynamic, and semi supervised. Word representations are functions of entire input sequences, and are computed on top of two bidirectional long-short term memory (LSTM) neural networks with character convolutions. This approach holds the structure and context of the sentence, rather than just converting a word to its vector. In other words, the ELMO vectorization approach may be used to convert the entire sentence or an entire review into a more meaningful vector.

The server (118) also may include a software application (130). The software application (130) may be a target, and thus the names of targets (112) may include the name of the software application (130). However, the software application (130) need not be part of the system of FIG. 1. In other words, the software application (130) may be operated by a third party, and the system of FIG. 1 is software-as-a-service that is used to find hidden technical issues in the software application (130).

The system shown in FIG. 1 also may include user devices (132). The user devices (132) are computers, such as desktops, laptops, tables, mobile phones, etc. The user devices (132) need not be under the control of an organization that operates the system of FIG. 1, and thus the user devices (132) may be only in communication with the system of FIG. 1 and not part of the system.

The user devices (132) each include a user input device (134). The user input device (134) is one or more of a keyboard, a mouse, a microphone, a touchscreen, etc., which allows the user to interact with the user devices (132).

The user devices (132) also each include a display device (136). The display device (136) is one or more of a display screen, a haptic output device, a speaker, etc. which allows a user to understand an output of the user devices (132) intended for consumption by a user.

The user devices (132) may be used to execute, access, or interact with the software application (130). The user devices (132) may also be used to execute, access, or interact with one or more information sources (138). The information sources (138) are websites, databases, bulletin boards, help desks, social media sites, news feeds, etc. where users of the user devices (132) may post raw natural language text that relates to the software application (130) and/or the names of targets (112). Thus, the information sources (138) contain raw natural language text that may be processed by the pre-processing controller (128) into the natural language text (102).

Figure 1B:
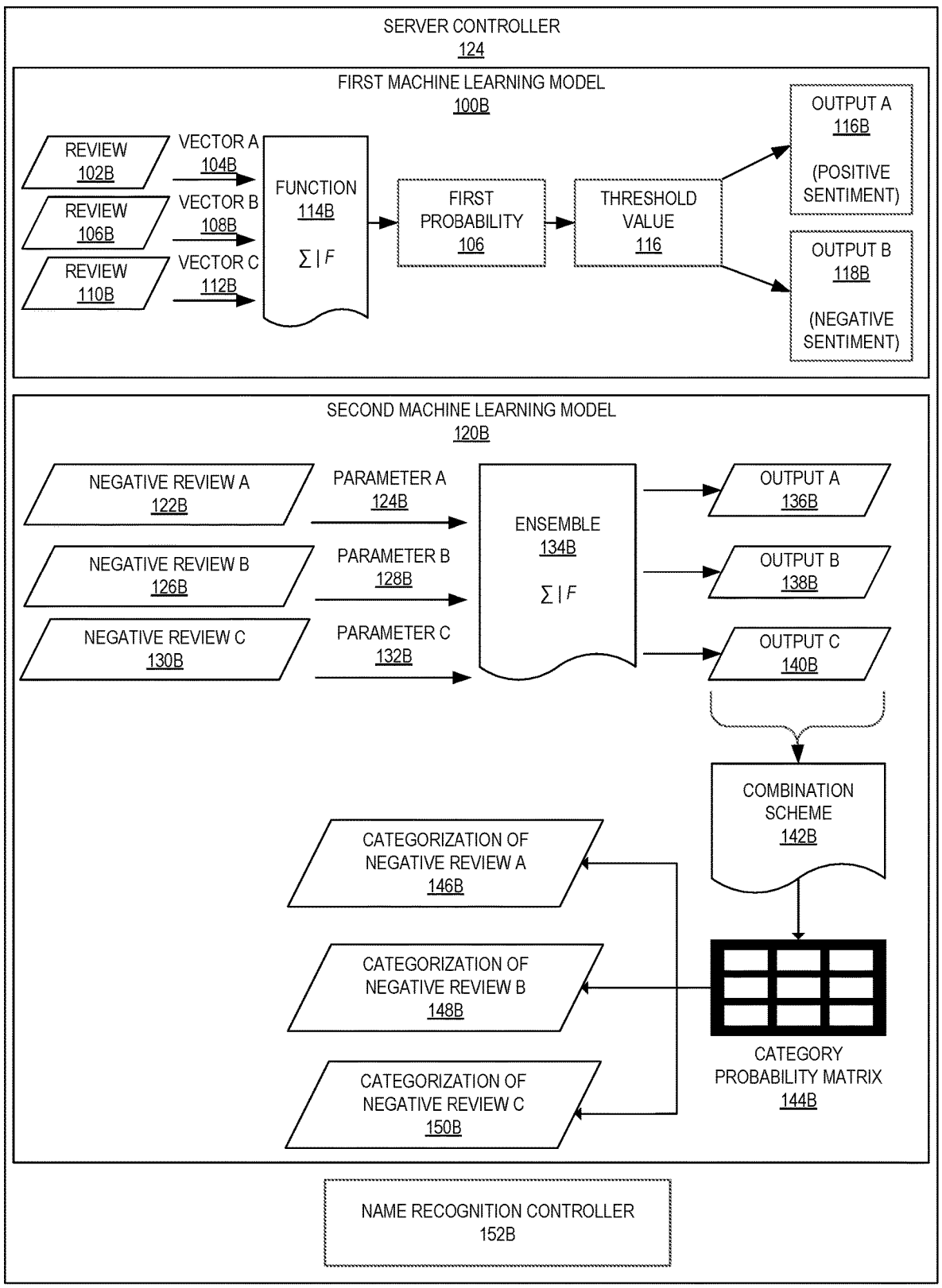

Attention is now turned to FIG. 1B, which shows details of the server controller (124). The server controller (124) includes two or more machine learning models, such as the first machine learning model (100B) and the second machine learning model (120B).

The first machine learning model (100B) is one or more machine learning algorithms programmed to determine whether an instance of the natural language text (102) of FIG. 1A contains a negative sentiment, and thus may be considered an instance of the negative review (104). The first machine learning model (100B) may be, for example, a logistic regression model (a "logistic regression MACHINE LEARNING MODEL"), or may be an unsupervised MLM. The input to the first machine learning model (100B) is the vector form of the natural language text (102) of FIG. 1A, and the output of the first machine learning model (100B) is the first probability (106). Again, the first probability (106) is the assessed probability that the first probability (106) has a negative sentiment. For example, instances of the natural language text (102) may be the review (102B), the review (106B), and the review (110B).

As indicated above, the reviews are converted into vectors. Thus, review (102B) is converted into vector A (104B); review (106B) is converted to vector B (108B), and review (110B) is converted to vector C (112B). The vectors in FIG. 1B are created using ELMO (Embeddings from Language Models) vectorization, which uses weights to make decision on converting the individual sentences to the vectors. The vectors then serve as input to the function (114B), which is the algorithm of the first machine learning model (100B). The function (114B) may be a logistic regression algorithm, also referred-to as a logistic regression machine learning model.

The output of the function (114B) is the first probability (106). An instance of the first probability (106) exists for each review input to the function (114B). Thus, while not shown in FIG. 1B, three instances of the first probability (106) may be present, one each for the review (102B), the review (106B), and the review (110B).

The first probability (106) is compared to the threshold value (116). If the threshold value (116) is not satisfied, then the natural language text (102) of FIG. 1A is classified as having a positive sentiment (output A (116B)). The natural language text (102) is then discarded or ignored during further processing. If the threshold value (116) is satisfied, then the natural language text (102) is classified as having a negative sentiment (output B (118B)). In the case of output B (118B), the natural language text (102) is classified as the negative review (104). In this manner, each of the review (102B), the review (106B), and the review (110B) is assessed as either being an instance of a negative review (104) (i.e., having a first probability (106) above the threshold value (116)) or an instance of a non-negative review having a positive sentiment (i.e., having a first probability (106) below the threshold value (116)).

The server controller (124) also includes a second machine learning model (120B). The second machine learning model (120B) is one or more machine learning algorithms programmed to categorize the negative reviews (e.g., the negative review (104) of FIG. 1A). The second machine learning model (120B) may be an ensemble of supervised and/or unsupervised MLMs, as described further below. In other words, the first machine learning model (100B) first classifies the natural language text (102) as including one or more negative reviews, and then the second machine learning model (120B) categorizes the negative reviews into different categories.

Other types of models may be used for the second machine learning model (120B). For example, a Multi-Layer Perceptron Model (MLP) may be used to categorize the negative reviews. A MLP is a fully connected class of feed forward artificial neural networks. However, other models may be used, like XGBoost, which is a decision-tree-based ensemble machine learning algorithm that uses a gradient boosting framework. Recurrent neural networks can also be used to categorize the reviews.

Three instances of the negative review (104) are shown in FIG. 1B: the negative review A (122B), the negative review B (126B), and the negative review C (130B). Each instance of a negative review serves as input to the ensemble (134B). The ensemble (134B) is one or more machine learning models, and in the example of FIG. 1B, is the ensemble of machine learning models shown in FIG. 1C.

One or more parameters may be associated with the machine learning models of the ensemble (134B). A parameter is a setting of a machine learning model, which changes the output of the machine learning model. A parameter is selected or automatically set in a manner calculated or intended to produce satisfactorily correct probabilities that a negative review is categorized in each of several different categories. The term "satisfactorily" means that the accuracy of the prediction of the ensemble (134B) is, over many iterations, correct within a threshold percentage of executions.

The parameters may be the same for each machine learning model when categorizing different negative reviews, or the parameters may be set for one or more of the negative reviews individually for each categorization task of the ensemble (134B). Thus, while one parameter is shown for each negative review (i.e., the parameter A (124B), the parameter B (128B), and the parameter C (132B)), it is not necessarily the case that each negative review is associated with one parameter. In an example, all three parameters apply to the negative review A (122B), one parameter applies to the negative review B (126B), and none of the parameters apply to the negative review C (130B) (i.e., the initial parameters of the ensemble (134B) are not adjusted when the negative review C (130B) is input to the ensemble (134B)). Furthermore, different parameters may be specified for different ones of the machine learning models contained in the ensemble (134B).

The output of the user input device (134) of FIG. 1A is a set of probabilities that a given negative review is categorized in two or more categories. One output is provided for each negative review. Thus, the output A (136B) is a first group of sets of probabilities that the negative review A (122B) is categorized in a set of categories. Each set in the first group of sets of probabilities is the output of one of the machine learning models in the ensemble (134B). Each probability in a given set of probabilities is the probability that the input is categorized in a corresponding category. Likewise, the output B (138B) is a second group sets of probabilities that the negative review B (126B) is categorized in the set of categories. Similarly, the output C (140B) is a third group of sets of probabilities that the negative review C (130B) is categorized in the set of categories.

For example, the set of categories may be "SOFTWARE NAME," "FUNCTION NAME," and "PROVIDER NAME." In this example, the negative review A (122B) is the input to the user input device (134). The output A (136B) is a group of sets of probabilities that the negative review A (122B) is categorized in each of the three categories. In this example, for simplicity and clarity, there are only two machine learning models in the ensemble (134B), model A and Model B. Model A outputs a set of probabilities that the negative review A (122B) has a 0.15 probability of being in the "SOFTWARE NAME" category, a 0.25 probability of being in the "FUNCTION NAME" category, and a 0.60 probability of being in the "PROVIDER NAME" category. Model B outputs a second set of probabilities that the negative review A (122B) has a 0.35 probability of being in the "SOFTWARE NAME" category, a 0.25 probability of being in the "FUNCTION NAME" category, and a 0.40 probability of being in the 'PROVIDER NAME" category. Thus, the output A (136B) is the group of both sets of probabilities: The set output by Model A, and the set output by Model B.

Each output may serve as input to a combination scheme (142B). The combination scheme (142B) is a set of rules, or perhaps yet another machine learning model, which takes as input the groups of sets of probabilities for the negative review in question and generates as output a single set of probabilities stored in a category probability matrix (144B). The category probability matrix (144B) is a data structure which holds the values of the probabilities that the negative review in question belongs to the set of possible categories.

For example, the combination scheme (142B) may be to average the probabilities generated for each category among the multiple models of the user input device (134). Thus, continuing the above example, the resulting set of probabilities for the negative review A (122B) would be a 0.25 averaged probability that the negative review A (122B) belongs to the "SOFTWARE NAME" category (an average of the probabilities generated by Model A and Model B of the ensemble (134B)). Similarly, there is a 0.25 averaged probability that the negative review A (122B) belongs to the "FUNCTION NAME" category, and a 0.50 averaged probability that the negative review B (122B) belongs to the "PROVIDER NAME" category.

The probabilities in the category probability matrix (144B) are then used to generate a categorization for the negative review in question. For example, the highest probability may be selected as being the most likely category for the negative review in question. Thus, a categorization is generated for each of the negative reviews, including a categorization of negative review A (146B), a categorization of negative review B (148B), and a categorization of negative review C (150B). Continuing the above example, the negative review A (122B) may be categorized under "PROVIDER NAME", because the highest averaged probability for the negative review A (122B) is associated with the category "PROVIDER NAME."

The server controller (124) may also include a name recognition controller (152B). The name recognition controller (152B) is programmed to identify, from the negative review, a name of a target of the negative review. The name of the target may be the category. Thus, as indicated above, the name of the target may be identified by assigning the category name with the highest corresponding probability to the target.

However, the name recognition controller (152B) may be a third machine learning model. In this case, the input to the MLM is the negative review, and the output of the machine learning model is a name of a target contained within the negative review. Operation of the name recognition controller (152B) is described with respect to step 206 of FIG. 2.

Figure 1C:
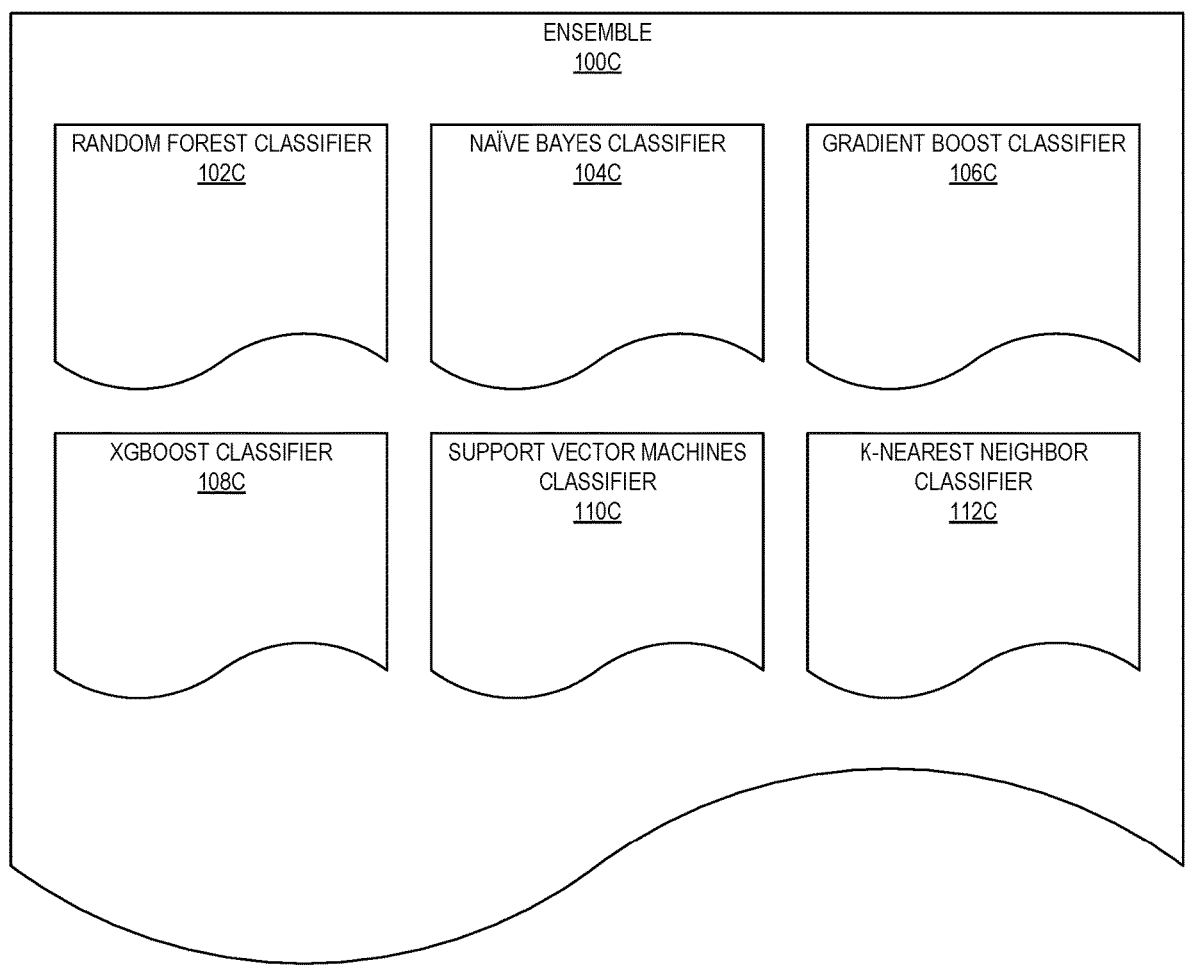

FIG. 1C shows examples of machine learning models that may be used with respect to the ensemble (134B) of FIG. 1B. Thus, the ensemble (100C) may include one or more of a random forest classifier (102C), a naive Bayes classifier (104C), a gradient boost classifier (106C), a XGBoost classifier (108C), a support vector machines classifier (110C), and a K-nearest neighbor classifier (112C). Each of the different machine learning models receive the negative review in question as input, with the negative review taking the form of a vector. The output of each of the different machine learning models is a set of probabilities that the negative review in question belongs to the established categories.

Figure 1D:
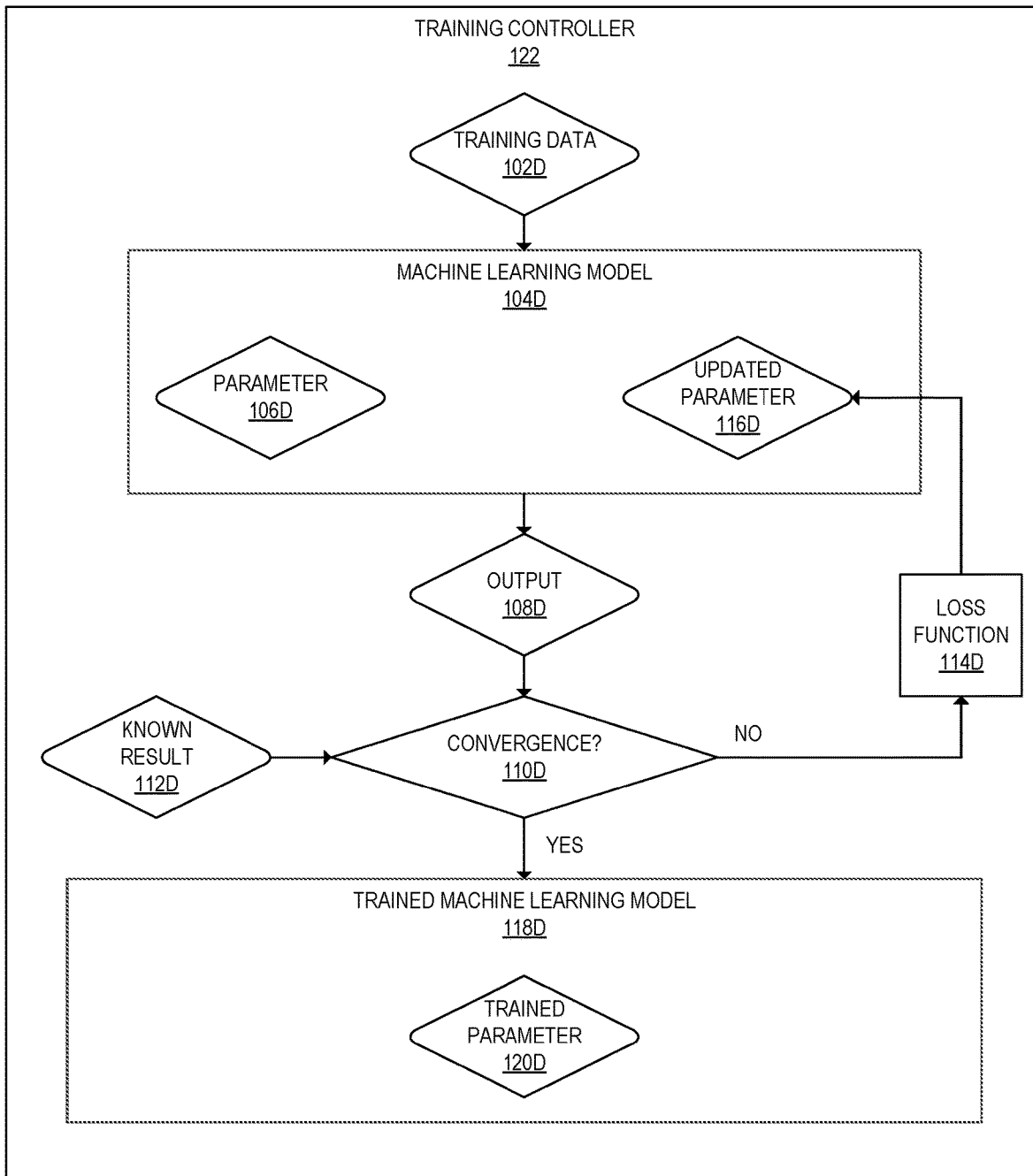

FIG. 1D shows an example of the training controller (122) from FIG. 1A. In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (118D)) is applied to the unknown data in order to make predictions.

In more detail, training starts with training data (102D). The training data relates to the purpose of the machine learning model. For example, the training data for the first machine learning model (100B) of FIG. 1B may be the sets of natural language text among which the negative reviews are already known. In another example, the training data (102D) may be correct categories into which the negative review A (122B), negative review B (126B), and negative review C (130B) of FIG. 1B have been placed. In other words, the training data (102D) is data for which the final result is known with certainty.

The training data (102D) is provided as input to the machine learning model (104D), which again may be any of the machine learning models described with respect to FIG. 1B or FIG. 1C. The machine learning model (104D), as described before, is an algorithm. However, the output of the algorithm may be changed by changing one or more parameters of the algorithm, such as the parameter (106D) of the machine learning model (104D). The parameter (106D) may be one or more weights, the application of a sigmoid function, a hyperparameter, or possibly many different variations that may be used to adjust the output of the function of the machine learning model (104D).

An initial value is set for the parameter (106D). The machine learning model (104D) is then executed on the training data (102D). The result is an output (108D), which is a prediction, a classification, a value, or some other output which the machine learning model (104D) has been programmed to output.

The output (108D) is provided to a convergence process (110D). The convergence process (110D) compares the output (108D) to the known result (112D). A determination is made whether the output (108D) matches the known result (112D) to a pre-determined degree. The pre-determined degree may be an exact match, a match to within a pre-specified percentage, or some other metric for evaluating how closely the output (108D) matches the known result (112D). Convergence occurs when the known result (112D) matches the output (108D) to within the pre-determined degree.

If convergence has not occurred (a "no" at the convergence process (110D)), then a loss function (114D) is generated. The loss function (114D) is a program which adjusts the parameter (106D) in order to generate an updated parameter (116D). The basis for performing the adjustment is defined by the program that forms the loss function (114D) but may be a scheme which algorithmically iteratively adjusts the parameter (106D) so that the next execution of the training data (102D) with the updated parameter (116D) will have an output (108D) that more closely matches the known result (112D).

In any case, the loss function (114D) is used to specify the updated parameter (116D). As indicated, the machine learning model (104D) is executed again on the training data (102D), this time with the updated parameter (116D), and the process iterates. The process continues to iterate until convergence.

Upon convergence (a "yes" result at the convergence process (110D)), the machine learning model (104D) is deemed to be a trained machine learning model (118D). The trained machine learning model (118D) has a final set of parameters, represented by the trained parameter (120D) in FIG. 1D.

During deployment, the trained machine learning model (118D) with the trained parameter (120D) is executed again, but this time on unknown data for which the final result is not known. The output of the trained machine learning model (118D) is then treated as a prediction of the information of interest relative to the unknown data.

While FIG. 1A through FIG. 1D show configurations of components, other configurations may be used without departing from the scope of the one or more embodiments. For example, various components may be combined to create a single component. As another example, the functionality performed by a single component may be performed by two or more components.

Figure 2:
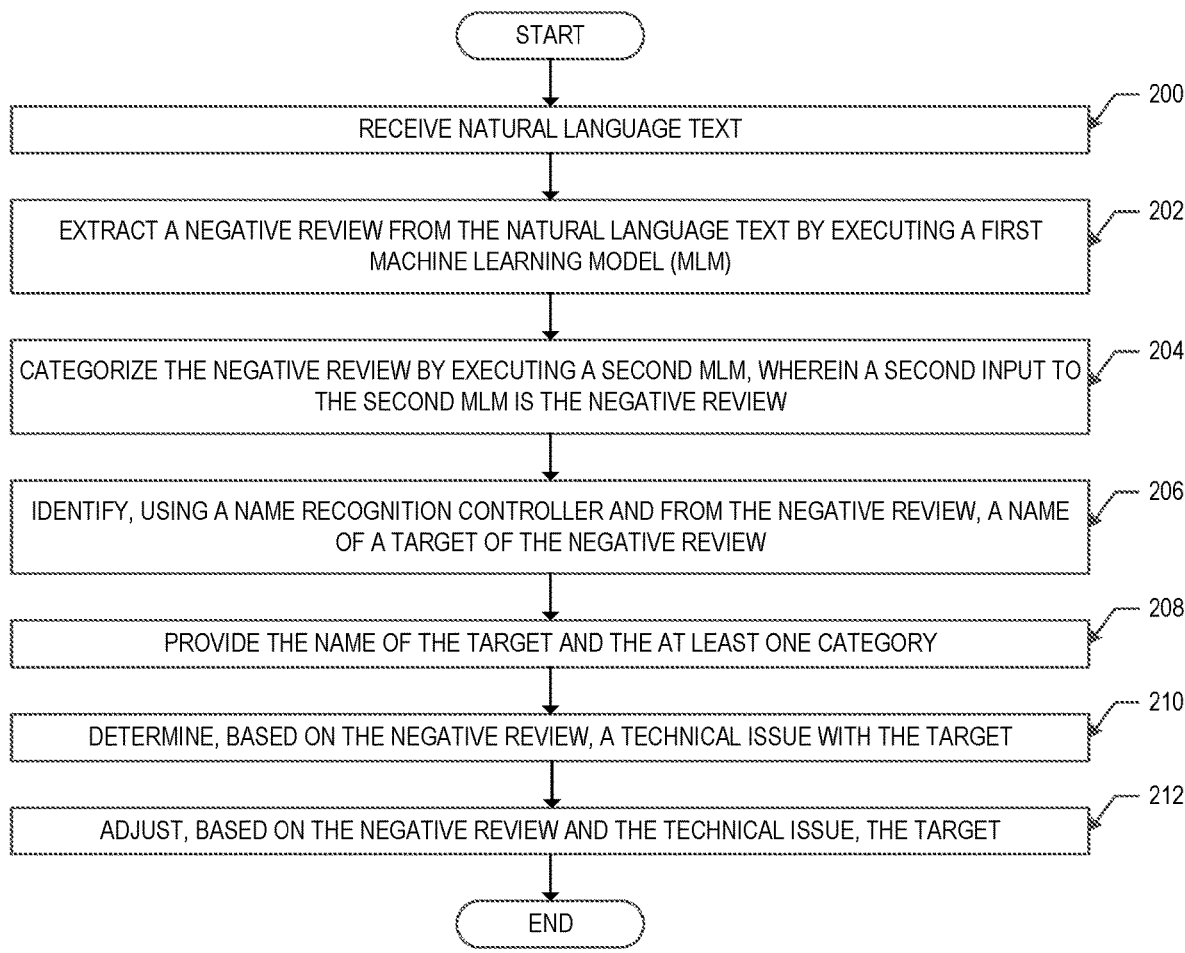
FIG. 2 and FIG. 3 show flowcharts, in accordance with one or more embodiments.
Figure 3:
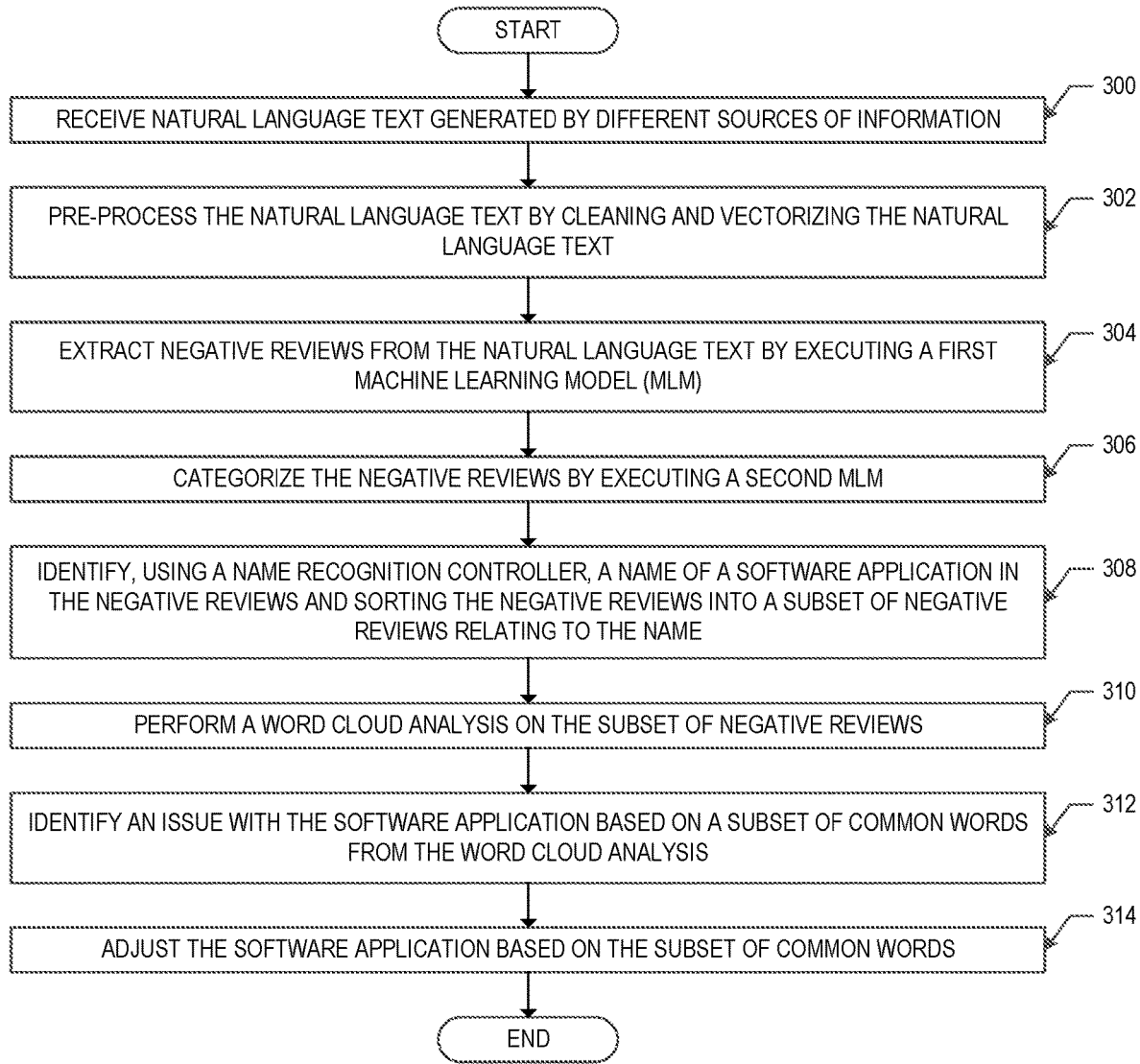

FIG. 2 and FIG. 3 are flowcharts, in accordance with one or more embodiments. FIG. 2 is an example of a method of identifying and resolving a hidden issue for a target. The method of FIG. 2 may be implemented using the system shown in FIG. 1A through FIG. 1D, and/or components of the computing system and network environment shown in FIG. 5A and FIG. 5B.

Step 200 includes receiving natural language text. The natural language text may be received by passively receiving text pushed by a source, or perhaps gathered by some other application and transmitted to a pre-processing controller. The natural language text may also be received by actively gathering data from one or more information sources. For example, screen scraping or HTML code may be used to read natural language text from a website. The natural language text may be retrieved from natural language statements made on different social media platforms, news sources, software application community forums, online help desks, help chats, transcribed help phone conversations, and possibly many other information sources.

Step 202 includes extracting a negative review from the natural language text by executing a first machine learning model (MLM). The first machine learning model may be as described with respect to the first machine learning model (100B) in FIG. 1B.

The negative review may be extracted as follows. A first input to the first MLM is the natural language text. A first output of the first MLM is a first probability that the negative review has a negative sentiment. The negative review is an instance of the natural language text having a corresponding negative sentiment probability above a threshold value. Thus, for example, if the first probability is above the threshold value, then the instance of natural language text is deemed to be a negative review. Accordingly, the instance of the natural language text corresponding to the negative review is extracted for further analysis. Other instances of the natural language text are either discarded or not used for further processing.

Step 204 includes categorizing the negative review by executing a second MLM. Categorization may be performed as follows. A second input to a second MLM is the negative review. The second MLM may be the second machine learning model (120B) in FIG. 1B. A second output of the second MLM is a second probability that the negative review is assigned to at least one category. The second output may also be a combination of outputs from an ensemble of MLMs, such as the ensemble (134B) described in FIG. 1B.

In an example, the second output may be a series of probabilities, correspondingly assigned to a number of categories. Each of the probabilities reflects a predicted percentage chance that the negative review is assigned to that category. The categories may be pre-established, as described with respect to FIG. 1B. The selected category for the negative review may be the category which corresponds to the highest predicted probability.

Step 206 includes identifying, using a name recognition controller and from the negative review, a name of a target of the negative review. The name of the target may be the category. Thus, as indicated above, the name of the target may be identified by assigning the category name with the highest corresponding probability to the target. Alternatively, as indicated with respect to the description of the name recognition controller (152B) in FIG. 1B, the name recognition controller may be a third machine learning model. In this case, the input to the MLM is the negative review, and the output of the machine learning model is a name of a target contained within the negative review. The third machine learning model may infer the name of the target, without the negative review containing the name of the target, by determining a probability that the negative review is classified as one of a number of pre-determined names.

Step 208 includes providing the name of the target and at least one category. Providing may be performed by transmitting the name of the target and the category into which the target falls to a software application for further processing. Providing may also be performed by displaying the name of the target and the category to a programmer or technician for review. Providing may also be performed by integrating the name of the target and the category into a dashboard or other GUI, that also displays other targets and categories, as shown in FIG. 4C through FIG. 4F.

Step 210 includes determining, based on the negative review, a technical issue with the target. For example, the target may be a software application. In this case, a technical issue with the software application may be determined. The determination may be performed by a computer technician but may also be performed automatically. For example, the negative review (and possibly other information, such as the category) may include an identified indication that the target (which is financial management software) is not communicating with a particular bank. The technical issue may be that the application programming interface of the financial management software is not properly configured to communicate with the bank's communication protocols. This technical problem may then be returned as the determined technical issue.

Step 210 may be optional in some embodiments. In other words, in an embodiment, the method of FIG. 2 may terminate at step 208 after providing the name of the target and at least one category.

Step 212 includes adjusting, based on the negative review and the technical issue, the target. Adjusting the target may be performed by adjusting the code of a software application, by changing one or more settings of the software application, by activating or deactivating network devices and/or other software applications, granting or denying access to the target to particular users, and many other possible adjustments, perhaps in combination with each other.

Step 212 may be optional in some embodiments. Nevertheless, the method of FIG. 2 terminates thereafter.

The method of FIG. 2 may be expanded or modified. For example, the method of FIG. 2 may also include pre-processing the natural language text, prior to extracting the negative review at step 202, by cleaning the natural language text to form cleaned data.

As part of pre-processing, the method may also include vectorizing the natural language text to generate the first input to the MLM at step 202. Vectorizing may include inputting the natural language text to a third MLM, such as a bi-directional long short term memory neural network. Vectorizing also may include receiving, as output from the third MLM, a matrix of numbers representing both the natural language text and contexts of sentences in the natural language text.

The method of FIG. 2 may also include performing, for each at least one category, a word count analysis. The output of the word count analysis may be a number of words of a selected word type that fall within the at least one category. In this case, the method of FIG. 2 may also include generating a word cloud image for the at least one category. Subsequently, at step 208, providing may include displaying the word cloud image on a display device. The word cloud may be generated as explained with respect to step 310 of FIG. 3.

In another variation of the method of FIG. 2, identifying the name of the target at step 206 may be identifying a provider name of a provider of a software application. In this case, the method of FIG. 2 may also include inferring, automatically, from the negative review and the provider name, a name of a software application to which the negative review applies. Inferring may be performed by, for example, extracting keywords from the negative review that describes functions that are particular to the application of interest. Thus, for example, while an end user may only mention a name of a software provider in a complaint left on a social media platform, the one or more embodiments nevertheless may be capable of identifying the name of the software application about which the end user complained.

Similarly, in a related example, assume that the target is a software application. In a like manner, the one or more embodiments may infer, from the negative review, an aspect of the software application which triggered the negative review. In a more specific example, while the end user may only mention the name of a software application in a recorded chat during an online software support chat session, the one or more embodiments may identify that the user's complaint stems from the difficulty that the user experiences when attempting to find a particular command of the software's GUI.

Continuing the example, adjusting in step 212 may then include adjusting the aspect of the software application based on the negative review. More particularly, the GUI may be adjusted to make the particular command more prominently displayed on the software's GUI. The adjustment may be tailored for a particular user in some embodiments, such as when a user logs into an online application and the application GUI is tailored to the user identity.

Attention is now turned to FIG. 3. FIG. 3 is another example method of the one or more embodiments and is more particularly a method for troubleshooting a software application. The method of FIG. 3 may also be executed using the system of FIG. 1A through FIG. 1D, possibly in conjunction with elements of the computing system and network environment of FIG. 5A and FIG. 5B.

Step 300 includes receiving natural language text generated by different sources of information. Receiving the natural language text may be performed as described with respect to step 200 of FIG. 2. However, in step 300, many different sources of information are accessed, and the raw natural language text collated for processing.

Step 302 includes pre-processing the natural language text by cleaning and vectorizing the natural language text. Pre-processing, cleaning, and vectorizing may be performed as described with respect to step 202 of FIG. 2. The pre-processing controller (128) of FIG. 1A may perform the cleaning and vectorizing of the natural language text.

Step 304 includes extracting negative reviews from the natural language text by executing a first machine learning model (MLM). Extracting the negative reviews may be performed as described with respect to step 202 of FIG. 2. Thus, for example, a first input to the first MLM is the natural language text and a first output of the first MLM is first probabilities that corresponding instances of the natural language text have negative sentiments.

The probabilities of negative sentiments for the corresponding instances are then compared to a threshold value. Those instances that have probabilities of negative sentiments that satisfy the threshold value are deemed to be the negative reviews and are then extracted from the natural language text.

Step 306 includes categorizing the negative reviews by executing a second MLM, as described with respect to step 204 of FIG. 2. Thus, for example, a second input to the second MLM is the negative reviews, and a second output of the second MLM is second probabilities that the corresponding negative reviews are assigned to corresponding categories. The second machine learning model may be the second machine learning model (120B) as described with respect to FIG. 1B.

Step 308 includes identifying, using a name recognition controller, a name of a software application in the negative reviews and sorting the negative reviews into a subset of negative reviews relating to the name Thus, while all of the negative review may be of interest to other providers or other software applications, for the purposes of troubleshooting the software application of interest, those negative reviews relating to the software application of interest are extracted and stored as a subset of interest.

Step 310 includes performing a word cloud analysis on the subset of negative reviews. The word cloud analysis may be performed by counting the number of times a word appears in the subset of negative reviews. During the word cloud analysis certain words may be ignored, such as articles, common adverbs (such as the word "that"), nonce terms, etc. A list of words is then generated from the remaining words, with each remaining word having a corresponding number representing the number of times the word appears. A picture may then be generated which changes the font size, orientation, and placement of a particular remaining word based on the number of times that particular remaining word appears in the subset of negative reviews. Those remaining words that appear the greatest number of times have the largest font size and are placed in oriented to be most apparent to a human user. In this manner, a technician may quickly identify the words that are more likely to be of greater interest in terms of identifying not only the name of the software application, but also the name of the provider, and perhaps a sense of the nature of the issue that may be the basis of a hidden technical problem in the software application.

Thus, step 312 includes identifying an issue with the software application based on a subset of common words from the word cloud analysis. The "common words" refer to those words in the subset of negative reviews that are common to the different negative reviews. As explained above, those words having the greatest frequency are more likely to reveal regarding the issue with the software application and may provide clues as to the nature of the hidden technical problem.

While step 312 may be performed by a human technician, step 312 may also be performed by an automated process. For example, a set of rules may be executed on the rules in order to select from among a number of technical issues correspond to the negative rules. In another example, another MLM (different than the first MLM and the second MLM) may be employed to classify the most commonly used words into different categories of technical problems (e.g., GUI problems, user error problems, communication problems, etc.) The automated process then may output a list of a subset of the technical problem categories.

Step 314 includes adjusting the software application based on the subset of common words. Adjusting may include a programmer changing the settings, GUI, or code of the software application. However, such changes may be made by an automated process. For example, once the most likely technical problem is identified from the subset of technical problem categories generated at step 312, an adjustment to the software application may be made according to automated rules. For example, if the GUI's usability is the hidden technical problem, then the GUI may be adjusted automatically to make a particular functional aspect of the GUI more readily apparent to one or more end users.

In one embodiment, the method of FIG. 3 may terminate thereafter. However, the method of FIG. 3 may also be extended or modified. For example, the method of FIG. 3. may also include calling up, as part of identifying the name of the software application at step 308, a selected negative review from the negative reviews, and then analyzing the selected negative review to determine the issue. For example, a technician or an automated process may identify a particular negative review as being most pertinent to troubleshooting the software application. The particular negative review may be subject to additional scrutiny and/or analysis to help identify the issue at step 312.

While the various steps in the flowcharts of FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 4A through FIG. 4F present a specific example of the techniques described above with respect to FIG. 1A through FIG. 3 for finding a hidden software issue. Thus, FIG. 4A through FIG. 4F should be considered as a whole, and accordingly share reference numerals and descriptions of common objects. The following example is for explanatory purposes only and not intended to limit the scope of the one or more embodiments.

Figure 4A:
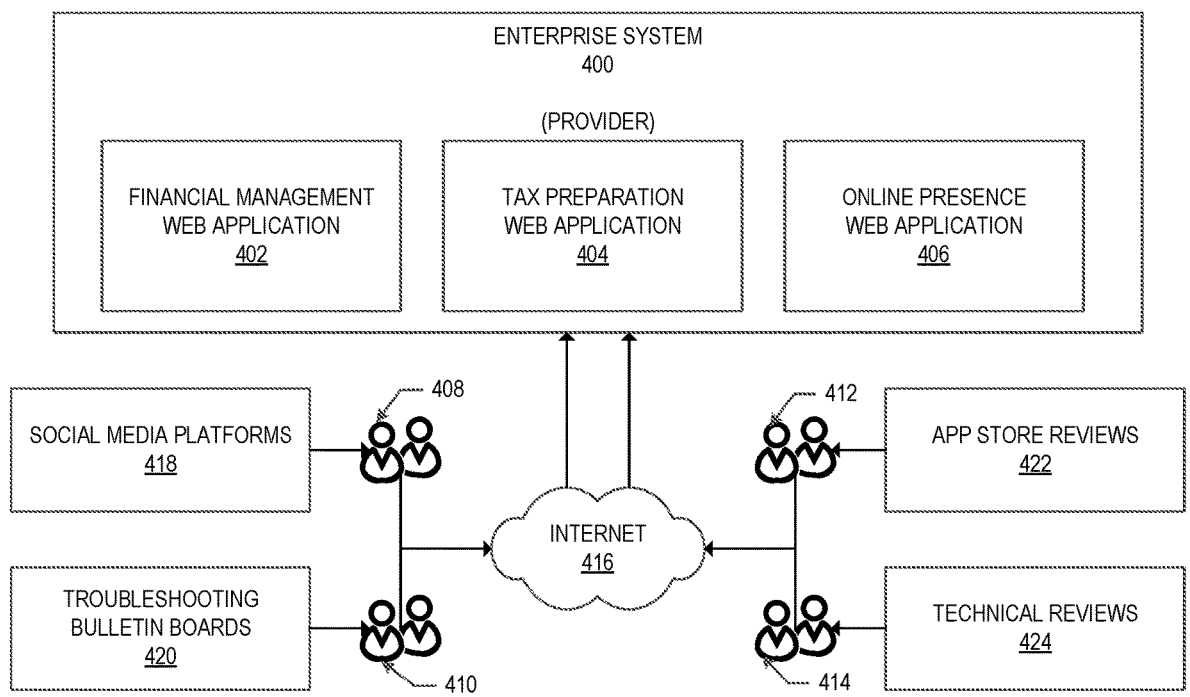
FIG. 4A, FIG. 4B, FIG. 4C, FIG. 4D, FIG. 4E, and FIG. 4F show aspects of an example of finding a hidden software issue, in accordance with one or more embodiments.

FIG. 4A shows an operating environment for the one or more embodiments. An enterprise system (400) is operated by a provider. The enterprise system (400) is a collection of software and/or hardware that provides a computerized function or service. In this case, the enterprise system (400) includes a number of different applications used by various end-users. The enterprise system (400) hosts a financial management web application (402) useful for managing and tracking an end-user's personal or business finances. The enterprise system (400) also includes a tax preparation web application (404) useful for preparing an end-user's personal or business taxes. The enterprise system (400) also includes an online presence web application (406) useful for helping an end user define and/or expand the end user's online presence. Not all end users may use all of the web applications.

In the example of FIG. 4, four groups of end users are shown, including a first group of end users (408), a second group of end users (410), a third group of end users (412), and a fourth group of end users (414). Any of the users in the groups of end users may use one, two, three, or even none of the web applications hosted by the enterprise system (400) via online interaction via the Internet (416). In other words, it is not necessary that an end user have personal experience with one of the three web applications in order to leave a negative review that contains information of value to the provider of the enterprise system (400).

Instead, the end users are grouped according to their use of other online applications or websites. Some end users in one group may also be present in one of the other groups. However, for the sake of clarity, the end users are grouped as follows.

The first group of end users (408) use one or more social media platforms (418). The second group of end users (410) use one or more trouble shooting bulletin boards (422). The trouble shooting bulletin boards (422) may, or may not, be supported by the provider of the enterprise system (400). The trouble shooting bulletin boards (422), however, are bulletin boards where end users leave messages discussing their experiences using one or more of the financial management web application (402), tax preparation web application (404), or online presence web application (406).

The third group of end users (412) leave app store reviews (420). Whether or not the third group of end users (412) actually use the web applications hosted on the enterprise system (400), the third group of end users (412) leave reviews on the app stores where users may download client-side applications configured to interact with the financial management web application (402), tax preparation web application (404), and online presence web application (406).

The fourth group of end users (414) write technical reviews (424). The technical reviews (424) may be posted on third party websites, in technical online journal articles, popular online magazines, etc. The technical reviews (424) relate to one of the financial management web application (402), tax preparation web application (404), online presence web application (406), or perhaps to the enterprise system (400) itself.

Figure 4B:
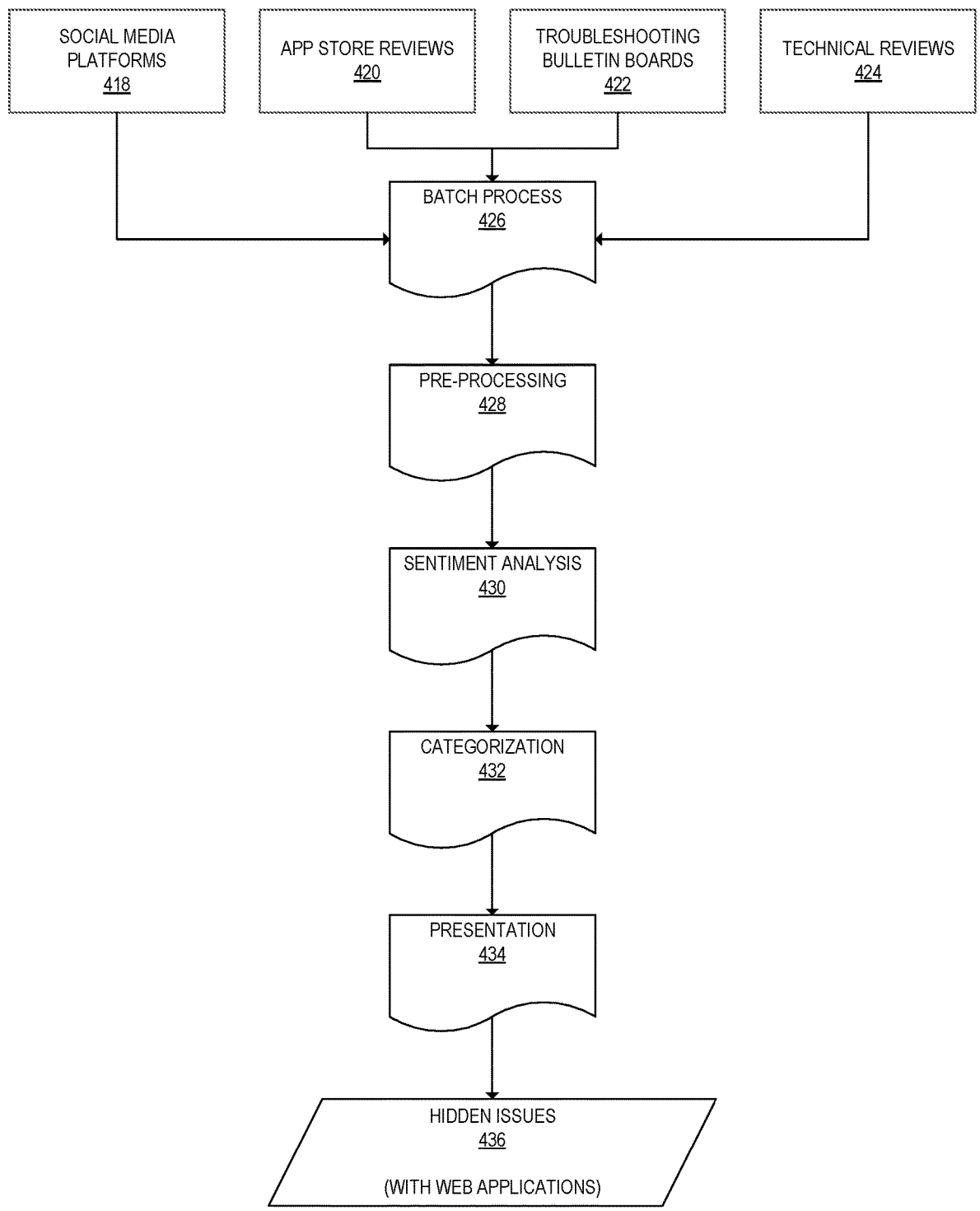

FIG. 4B shows an overview of a method for discovering hidden issues with any of the enterprise system (400) of FIG. 1A, financial management web application (402), tax preparation web application (404), or online presence web application (406) of FIG. 4A. The method of FIG. 4B is an alternative to the method of FIG. 2 and the method of FIG. 3. The method of FIG. 4B may be implemented using the system of FIG. 1A through FIG. 1D, and/or elements of the computing system and network environment shown in FIG. 5A and FIG. 5B. In the example of FIG. 4B, the social media platforms (418), app store reviews (420), troubleshooting bulletin boards (422), and technical reviews (424) are examples of different sources of information that serve as the sources of raw natural language text.

The method begins by executing a batch process (426). The batch process (426) gathers the natural language text in the social media platforms (418), app store reviews (420), troubleshooting bulletin boards (422), and technical reviews (424). Gathering may be performed by the sources of information pushing the information to the batch process (426), or by the batch process (426) gathering the data (such as by use of a data bot).

Next, the method includes pre-processing (428). The pre-processing (428) is performed by cleaning the natural language text gathered during the batch process (426). Cleaning involves separating the natural language text as identified instances of text (e.g., one technical review may be one instance). The instances of text may be further cleaned by removing articles, nonce terms, non-text symbols, text that does not make grammatical sense, etc. The pre-processing (428) then includes vectorizing the instances of text. Again, vectorization transforms the instances of text into a format that may be input to a machine learning model. For example, vectorizing an instance of text may include transforming the instance of text into a one dimensional table that converts individual words into numbers that represent the words.

Once the instances of text have been pre-processed, the method proceeds to perform a sentiment analysis (430). The sentiment analysis (430) may be performed according to the techniques described with respect to step 202 of FIG. 2 or step 304 of FIG. 3. In other words, the sentiment analysis identifies those instances of the natural language text that are designated as negative reviews.

Next, during categorization (432), the negative reviews are categorized into two or more different categories. Categorization is described with respect to step 204 of FIG. 2 or step 306 of FIG. 3. In other words, the negative reviews are sorted by category, such as by application type (e.g., whether the negative reviews relate to the enterprise system (400), the financial management web application (402), the tax preparation web application (404), and/or the online presence web application (406)) of FIG. 4A.

It is possible that a negative review may be categorized in more than one category. In this case, the negative review may be duplicated and/or further analyzed with respect to each of the different categories.

After the categorization (432), the categorized negative reviews are presented during the presentation (434) step. Presentation (434) is described with respect to step 208 of FIG. 2. However, the presentation (434) may also be performed by performing a word cloud analysis and presenting a word cloud, such as at step 310 of FIG. 3. The presentation (434) may be performed with respect to a technician user (e.g., by displaying the categorized negative reviews to the technician user) or with respect to an automated process (e.g., by providing some other application input relating to the presentation (434)).

One or more hidden issues (436) are then identified, based on the presentation (434). The hidden issues (436) may include, for example, an indication that a GUI of the tax preparation web application (404) of FIG. 4A is difficult to use, or perhaps perceived as being confusing, by one or more of the groups of users. Optionally, action may be taken to adjust the web application in question in order to mitigate or correct the one or more hidden issues (436).

Figure 4C:
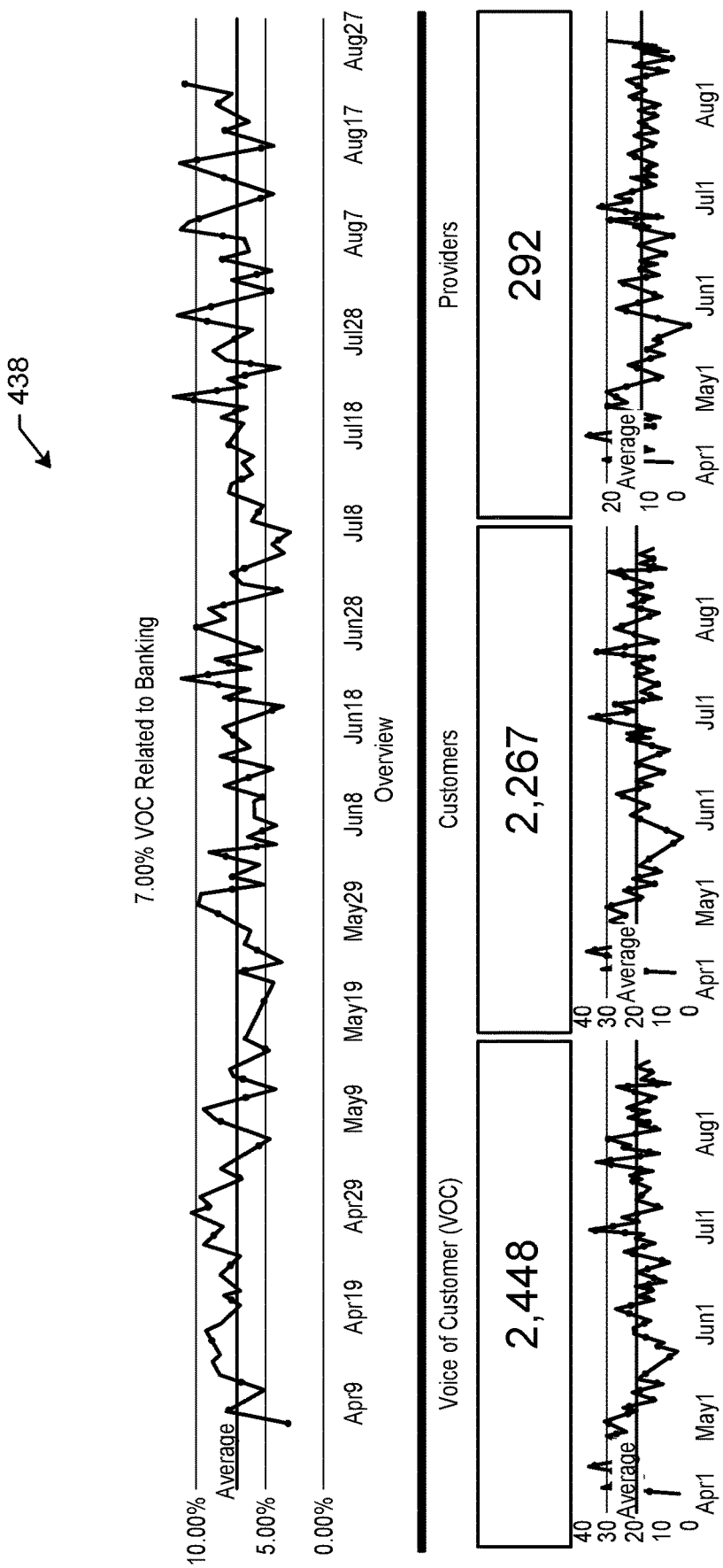

Turning to FIG. 4C, the data collected during the method of FIG. 4B may be collated and then presented on a dashboard (438) for use by a technician responsible for helping to maintain the enterprise system (400) and/or one or more of the financial management web application (402), tax preparation web application (404), or online presence web application (406) of FIG. 4A. For example, the dashboard (438) shows an overview of identified issues with respect to a banking application that is part of the financial management web application (402). The term "VOC" refers to "voice of customer," referring to the fact that, in the example of FIG. 4C, the natural language text reviews of end users (i.e., customers) of the financial management web application (402) have been processed according to the one or more embodiments. Additionally, the natural language text from chats with providers, agents responsible for helping the end users, is also tracked. Over a period of days and months, the number of negative reviews is tracked. A spike in negative reviews may indicate further investigation, as a new hidden issue may have arisen with respect to the banking application.

Figure 4D:
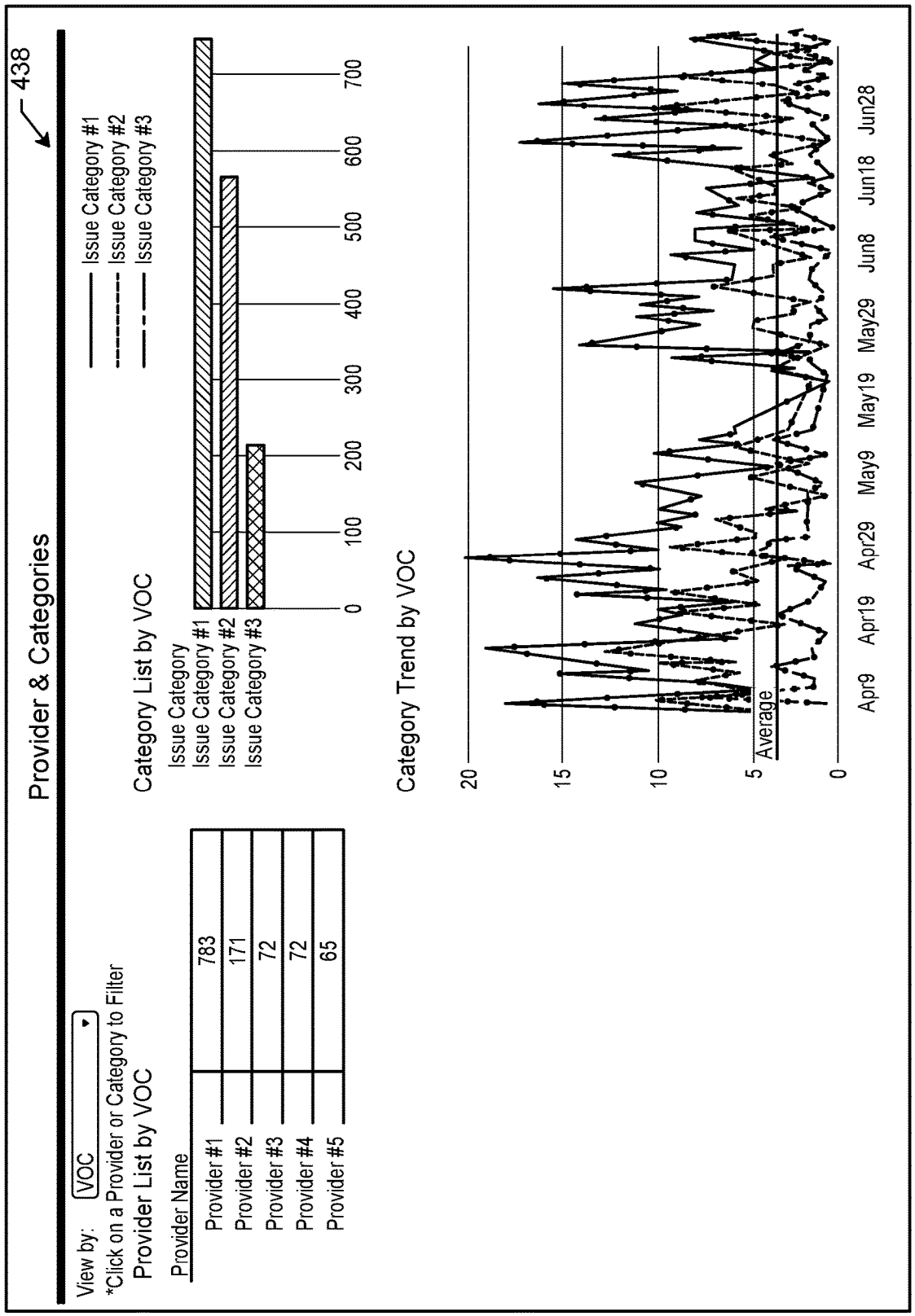

FIG. 4D shows another example of a dashboard (438). In this case, the categories of hidden issues discovered by the one or more embodiments are tracked over time. A spike in negative reviews in one of the categories may indicate the appearance of a new hidden issue to be resolved with respect to the banking application. The different lines in the graphs shown in FIG. 4D indicate the different categories and the relative numbers of negative reviews per category. The category with the greatest number of negative reviews may also be subject to greater scrutiny in order to determine why the end users are unhappy with respect to that category. Appropriate technical action may then be taken with respect to the hidden issue revealed by the negative reviews left by the end users.

Figure 4E:
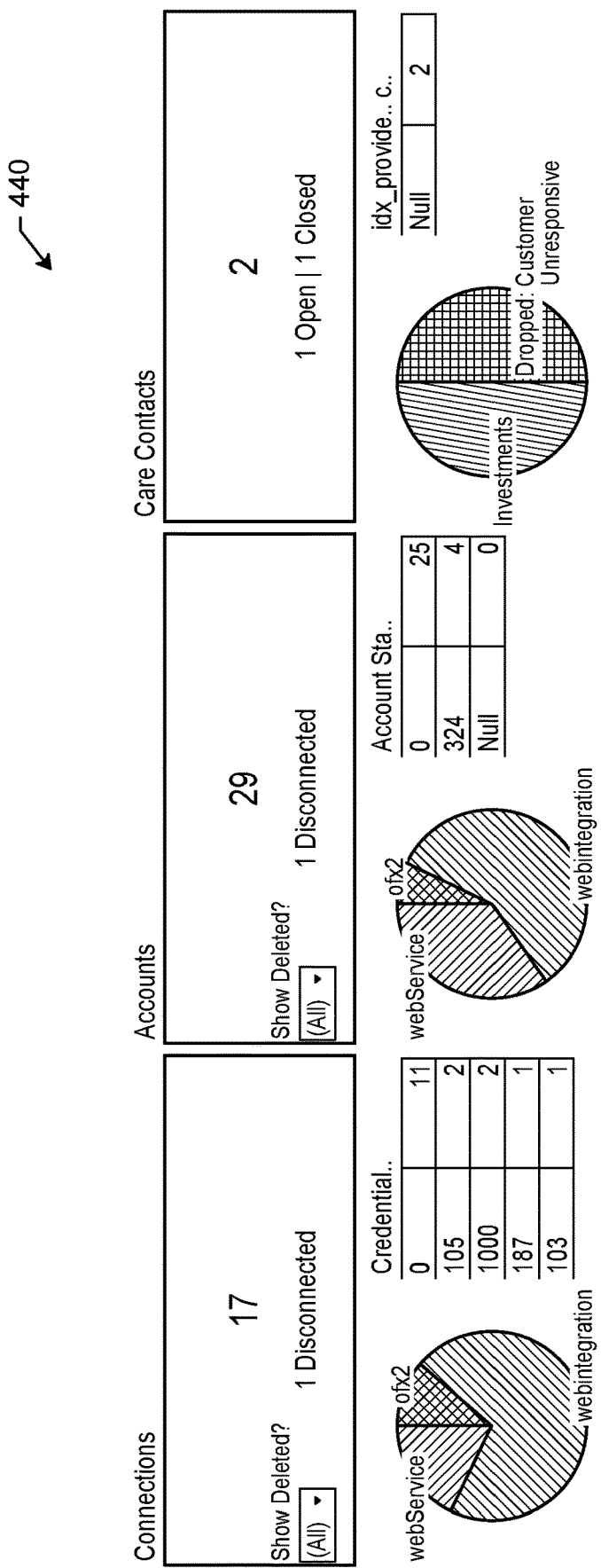
Figure 4F:

FIG. 4E shows yet another example of a dashboard (440). In this case, the categories are shown as pie charts and different issues within the categories are shown as slices in the pie charts. Again, the information shown may help a technician more quickly identify the target and the nature of the hidden issue and, then take appropriate action to mitigate the hidden issue.

FIG. 4F shows an example of a word cloud (442). The word cloud (442) may have been generated as described with respect to step 310 of FIG. 3. In the word cloud (442) of FIG. 4F, the word "account" appears the greatest number of times, the word "bill" applies the second greatest number of times, and the word "update" appears the third greatest number of times. In the context that the word cloud (442) was generated from negative reviews, a technician or automated process may infer that a problem may exist with respect to updating an aspect of tracking billing accounts for the financial management web application (402) of FIG. 4A. The technician or automated process may then review the negative reviews in more detail to detect the nature of the hidden issue and hypothesize as to the cause of the hidden issue. The technician or automated process may then take appropriate action to mitigate the hidden issue.

Figure 5A:
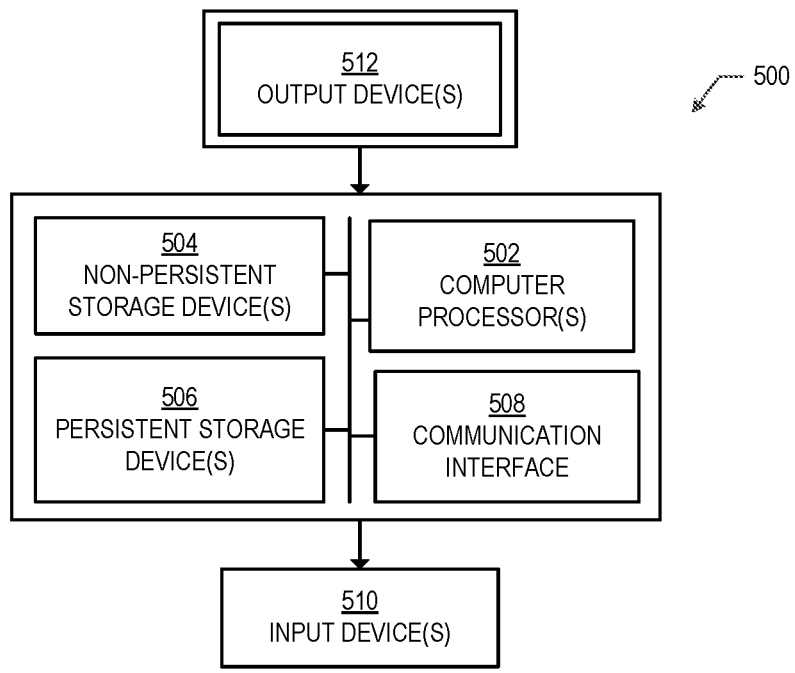
FIG. 5A and FIG. 5B show a computing system and network environment, in accordance with one or more embodiments.
Figure 5B:
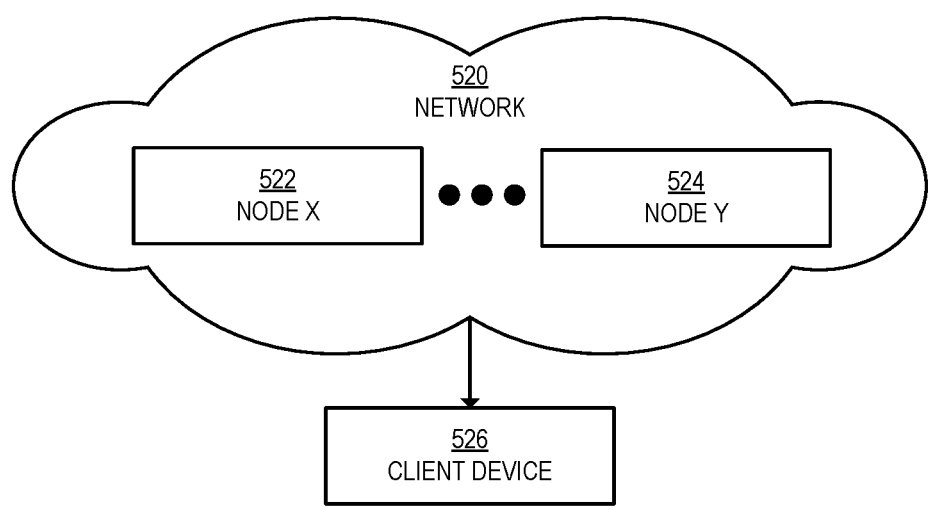

FIG. 5A and FIG. 5B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of the one or more embodiments.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode, and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the terms "connected to" or "in communication with" contemplate multiple meanings. A connection or communication may be direct or indirect. For example, computer A may be directly connected to, or communicate with, computer B by means of a direct communication link. Computer A may be indirectly connected to, or communicate with, computer B by means of a common network environment to which both computers are connected. A connection or communication may be wired or wireless. A or connection or communication may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method of troubleshooting a software application, comprising:
    receiving natural language text generated by a plurality of different sources of information;
    pre-processing the natural language text by cleaning and vectorizing the natural language text;
    extracting a plurality of negative reviews from the natural language text by executing a first machine learning model (MLM), wherein a first input to the first MLM is the natural language text and a first output of the first MLM is first probabilities that the plurality of negative reviews have negative sentiments, and wherein the plurality of negative reviews comprise instances of the natural language text having corresponding negative sentiment probabilities above a threshold value;
    categorizing the plurality of negative reviews by executing a second MLM, wherein a second input to the second MLM is the plurality of negative reviews, and wherein a second output of the second MLM is second probabilities that the plurality of negative reviews are assigned to a plurality of categories;
    identifying, using a name recognition controller and based on categorizing, a name of a software application in the plurality of negative reviews and sorting the plurality of negative reviews into a subset of negative reviews relating to the name; and
    adjusting the software application, named by the name recognition controller, based on the subset of negative reviews.

2. The method of claim 1, further comprising: performing, for each of the plurality of categories, a word count analysis comprising a number of words of a selected word type that fall within the plurality of categories; and generating a word cloud image for the plurality of categories.

3. The method of claim 1, further comprising:
    calling up, as part of identifying the name of the software application, a selected negative review from the subset of negative reviews and analyzing the selected negative review to determine a technical issue of the software application.

4. The method of claim 1, further comprising:
    inferring, from the subset of negative reviews, an aspect of the software application which triggered the negative review; and
    adjusting the aspect of the software application based on the subset of negative reviews.

5. The method of claim 1, wherein the second MLM comprises an ensemble of a plurality of supervised MLMs, and wherein the second output comprises a combination of outputs of the plurality of supervised machine learning models.

6. The method of claim 1 wherein the name recognition controller comprises a third MLM, wherein identifying the name further comprises executing the third MLM, and wherein the third MLM takes as input the plurality of negative reviews and generates, as output, the name.

7. The method of claim 1, wherein receiving the natural language text comprises retrieving a plurality of natural language statements made on a plurality of different social media platforms.

8. A method of troubleshooting a software application, comprising:
    receiving natural language text generated by a plurality of different sources of information;
    pre-processing the natural language text by cleaning and vectorizing the natural language text to form cleaned data;
    vectorizing the cleaned data to generate a first input, wherein vectorizing comprises inputting the natural language text to a third MLM comprising a bi-directional long short term memory neural network, and receiving, as output from the third MLM, the first input comprising a matrix of numbers representing both the natural language text and contexts of sentences in the natural language text;
    extracting, after pre-processing, a plurality of negative reviews from the natural language text by executing a first machine learning model (MLM), wherein the first MLM receives the first input, and, when executed, generates a first output comprising first probabilities that the plurality of negative reviews have negative sentiments, and wherein the plurality of negative reviews comprise instances of the natural language text having corresponding negative sentiment probabilities above a threshold value;
    categorizing the plurality of negative reviews by executing a second MLM, wherein a second input to the second MLM is the plurality of negative reviews, and wherein a second output of the second MLM is second probabilities that the plurality of negative reviews are assigned to a plurality of categories;
    identifying, using a name recognition controller and based on categorizing, a name of the software application in the plurality of negative reviews and sorting the plurality of negative reviews into a subset of negative reviews relating to the name;
    performing a word cloud analysis on the subset of negative reviews;
    identifying an issue with the software application based on a subset of common words from the word cloud analysis; and
    adjusting the software application based on the subset of common words.

9. The method of claim 8, further comprising:
calling up, as part of identifying the name of the software application, a selected negative review from the subset of negative reviews and analyzing the selected negative review to determine the issue.

10. The method of claim 8 further comprising:
determining, based on the subset of negative review 2, a technical issue with the software application.

11. The method of claim 10, further comprising:
adjusting, based on the subset of negative reviews and the technical issue, the software application.

12. The method of claim 8, wherein receiving the natural language text comprises retrieving a plurality of natural language statements made on a plurality of different social media platforms.

13. The method of claim 8, wherein identifying the name comprises identifying a provider name of a provider of a software application, and wherein the method further comprises:
inferring automatically, from the subset of negative reviews and the provider name, the name of the software application to which the negative review applies.

14. The method of claim 8, further comprising:
inferring, from the subset of negative reviews, an aspect of the software application which triggered the negative review; and
adjusting the aspect of the software application, named by the name recognition controller, based on the negative review.

15. A method comprising:
receiving natural language text;
pre-processing the natural language text by cleaning the natural language text to form cleaned data;
vectorizing the cleaned data to generate a first input, wherein vectorizing comprises inputting the natural language text to a third MLM comprising a bi-directional long short term memory neural network, and receiving, as output from the third MLM, the first input comprising a matrix of numbers representing both the natural language text and contexts of sentences in the natural language text;
extracting, after pre-processing, a negative review from the natural language text by executing a first machine learning model (MLM), wherein the first MLM receives the first input and, when executed, generates a first output comprising a first probability that the negative review has a negative sentiment, and wherein the negative review comprises an instance of the natural language text having a corresponding negative sentiment probability above a threshold value;
categorizing the negative review by executing a second MLM, wherein a second input to the second MLM is the negative review, and wherein a second output of the second MLM is a second probability that the negative review is assigned to at least one category;
identifying, using a name recognition controller and from the negative review, a name of a target of the negative review; and
providing the name of the target and the at least one category.

16. The method of claim 15, wherein the target comprises at least one of a software application, a provider of the software application, and an aspect of the software application.

17. The method of claim 15, wherein the target comprises a software application, and wherein the method further comprises:
determining, based on the negative review, a technical issue with the software application.

18. The method of claim 17, further comprising:
adjusting, based on the negative review and the technical issue, the software application.

19. The method of claim 15, wherein the second MLM comprises an ensemble of a plurality of supervised MLMs, and wherein the second output comprises a combination of outputs of the plurality of supervised MLMs.

20. The method of claim 15, wherein receiving the natural language text comprises retrieving a plurality of natural language statements made on a plurality of different social media platforms.

* * * * *